United States Patent
Swaminathan et al.

(10) Patent No.: US 11,630,682 B2
(45) Date of Patent: Apr. 18, 2023

(54) REMOTING USER CREDENTIAL INFORMATION TO A REMOTE BROWSER

(71) Applicant: CITRIX SYSTEMS, INC., Fort Lauderdale, FL (US)

(72) Inventors: Balasubramanian Swaminathan, Fort Lauderdale, FL (US); Kireeti Valicherla, Parkland, FL (US); Sam Arun Seeniraj, Coral Springs, FL (US)

( * ) Notice: Subject to any disclaimer, the term of this patent is extended or adjusted under 35 U.S.C. 154(b) by 250 days.

(21) Appl. No.: 16/845,201

(22) Filed: Apr. 10, 2020

(65) Prior Publication Data
US 2021/0318894 A1    Oct. 14, 2021

(51) Int. Cl.
| | |
|---|---|
| *G06F 21/31* | (2013.01) |
| *G06F 9/455* | (2018.01) |
| *G06F 9/445* | (2018.01) |
| *G06F 21/45* | (2013.01) |

(52) U.S. Cl.
CPC .......... *G06F 9/455* (2013.01); *G06F 9/44526* (2013.01); *G06F 21/31* (2013.01); *G06F 21/45* (2013.01); *G06F 2221/2103* (2013.01)

(58) Field of Classification Search
CPC ...... G06F 21/6245; G06F 9/455; G06F 21/31; G06F 21/45; G06F 9/44526; G06F 2221/2103
See application file for complete search history.

(56) References Cited

U.S. PATENT DOCUMENTS

| | | | | |
|---|---|---|---|---|
| 9,038,149 | B2* | 5/2015 | Garlick | H04L 63/08 726/5 |
| 10,331,471 | B1* | 6/2019 | Viktorov | G06F 21/45 |
| 10,552,639 | B1* | 2/2020 | Buzbee | G06F 21/6245 |
| 2008/0098464 | A1* | 4/2008 | Mizrah | G06F 21/36 726/5 |
| 2009/0208020 | A1* | 8/2009 | Grynberg | H04L 9/3263 726/5 |
| 2014/0173708 | A1* | 6/2014 | Garlick | H04L 63/083 726/7 |
| 2018/0083959 | A1* | 3/2018 | Barbosa | H04W 12/068 |
| 2019/0050557 | A1* | 2/2019 | Martin | H04L 63/08 |
| 2020/0104478 | A1* | 4/2020 | Chauhan | H04L 67/02 |
| 2021/0318894 | A1* | 10/2021 | Swaminathan | G06F 21/45 |

* cited by examiner

*Primary Examiner* — Dao Q Ho

(57) ABSTRACT

A computing system includes a virtual server to provide a virtual computing session, and a client device to access the virtual computing session via a communications network. The virtual computing session includes a remote browser, and the client device includes a local browser to access user credential information. The remote browser is used to navigate to a website requiring user authentication, receive a user credential challenge from the website, and request the user credential information from the client device to satisfy the user credential challenge. The client device provides the user credential information to the remote browser for user authentication via the local browser, so as to satisfy the user credential challenge of the website.

13 Claims, 9 Drawing Sheets

REMOTING USER CREDENTIAL INFORMATION TO A REMOTE BROWSER

TECHNICAL FIELD

The present disclosure relates to desktop virtualization, and more particularly, to remote browsers.

BACKGROUND

Many organizations are now using desktop virtualization to provide a more flexible option to address the varying needs of their users. In desktop virtualization, a user's computing environment may be separated from the user's physical computing device.

Using client-server technology, a virtualized desktop may be stored in and administered by a remote server, rather than in the local storage of the client device. A virtualized desktop may include a virtualized browser, which may also be referred to as a hosted or remote browser.

SUMMARY

A computer system includes a virtual server configured to provide a virtual computing session comprising a remote browser, and a client device configured to access the virtual computing session via a communications network. The client device includes a local browser configured to access user credential information. The remote browser is configured to navigate to a website requiring user authentication, receive a user credential challenge from the website, and request the user credential information from the client device to satisfy the user credential challenge. The client device may be further configured to provide the user credential information to the remote browser for user authentication via the local browser, so as to satisfy the user credential challenge of the website.

The remote browser may include a browser hook configured to detect receipt of the user credential challenge from the website, and provide the user credential challenge to the client device.

The browser hook may be further configured to receive the user credential information from the client device, and provide the user credential information to the remote browser for user authentication.

The website may include a web page with login fields, and the remote browser may enter the user credential information into the login fields without user input.

The computing system may further include a password manager configured to store the user credential information. The local browser may include a password manager plugin configured to receive the user credential challenge from the remote browser, forward the user credential challenge via the local browser to the password manager to retrieve the user credential information, and provide the retrieved user credential information to the remote browser.

The client device may establish a virtual channel with the virtual server in response to the password manager plugin being included within the local browser. The virtual channel is for exchanging the user credential challenge and the user credential information.

The remote browser may be configured to receive browsing data from the website, and to isolate the received browsing data from the client device.

The remote browser may be configured to launch a remote browsing session, and a user of the client device cannot return to the remote browsing session after the remote browser session is closed.

The remote browser may have a web address associated therewith, and wherein the local browser may be configured to launch the remote browser using the web address.

Another aspect is directed to a server that includes a processor and a memory coupled to the processor. The processor is configured to provide a virtual computing session comprising a remote browser, with the virtual computing session accessible by a client device comprising a local browser configured to access user credential information. The remote browser is operated to navigate to a website requiring user authentication, receive a user credential challenge from the website, request the user credential information from the client device to satisfy the user credential challenge, and receive the user credential information from the client device to be used by the website for user authentication.

Another aspect is directed to a client device that includes a memory configured to store a local browser configured to access user credential information, and a processor coupled to the memory. The processor is configured to access a virtual computing session comprising a remote browser, and receive a request for the user credential information from the remote browser. The user credential information is to satisfy a user credential challenge of a website accessible from the remote browser. The processor is further configured to retrieve via the local browser the user credential information that satisfies the user credential challenge, and provide the retrieved user credential information to the remote browser to enable access to the website via the remote browser.

Yet another aspect is directed to a method for operating a server as described above. The method includes providing a virtual computing session comprising a remote browser, with the virtual computing session accessible by a client device comprising a local browser configured to access user credential information. The method further includes operating the remote browser to navigate to a website requiring user authentication, receive a user credential challenge from the website, request the user credential information from the client device to satisfy the user credential challenge, and receive the user credential information from the client device to be used by the website for user authentication.

Yet another aspect is directed to a method for operating a client device as described above. The method includes accessing a virtual computing session comprising a remote browser, and receiving a request for user credential information from the remote browser. The user credential information is to satisfy a user credential challenge of a website accessible from the remote browser. The method further includes retrieving via a local browser the user credential information that satisfies the user credential challenge, and providing the retrieved user credential information to the remote browser to enable access to the website via the remote browser.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

In desktop virtualization, a user of a client device may access a virtual server that provides a virtual computing session. The virtual computing session may include a hosted or remote browser. To protect an organization's network from browser-based attacks, the remote browser may be configured as a secure browser service. An example secure browser service is Citrix Secure Browser by Citrix Systems, Inc.

When configured as a secure browser, the remote browser enhances security of a virtual computing session by isolating web browsing. By isolating web browsing, a website accessed by the remote browser does not directly transfer any browsing data to or from the client device.

A drawback of isolating web browsing is that the remote browser does not support the use of password managers on a local device or within a local computing environment. A password manager is a tool that stores a user's login credentials for various websites, and can generally be used to automatically populate or auto-fill the login fields of a website with the appropriate set of credentials.

The techniques and teachings of the present disclosure provide the ability to auto-fill the login field of a website to be accessed in a remote browsing session within a remote browser using information from a password manager on the local device or within the local environment. Usability of the remote browser is advantageously enhanced by making the user authentication process seamless to the user.

Figure 1:
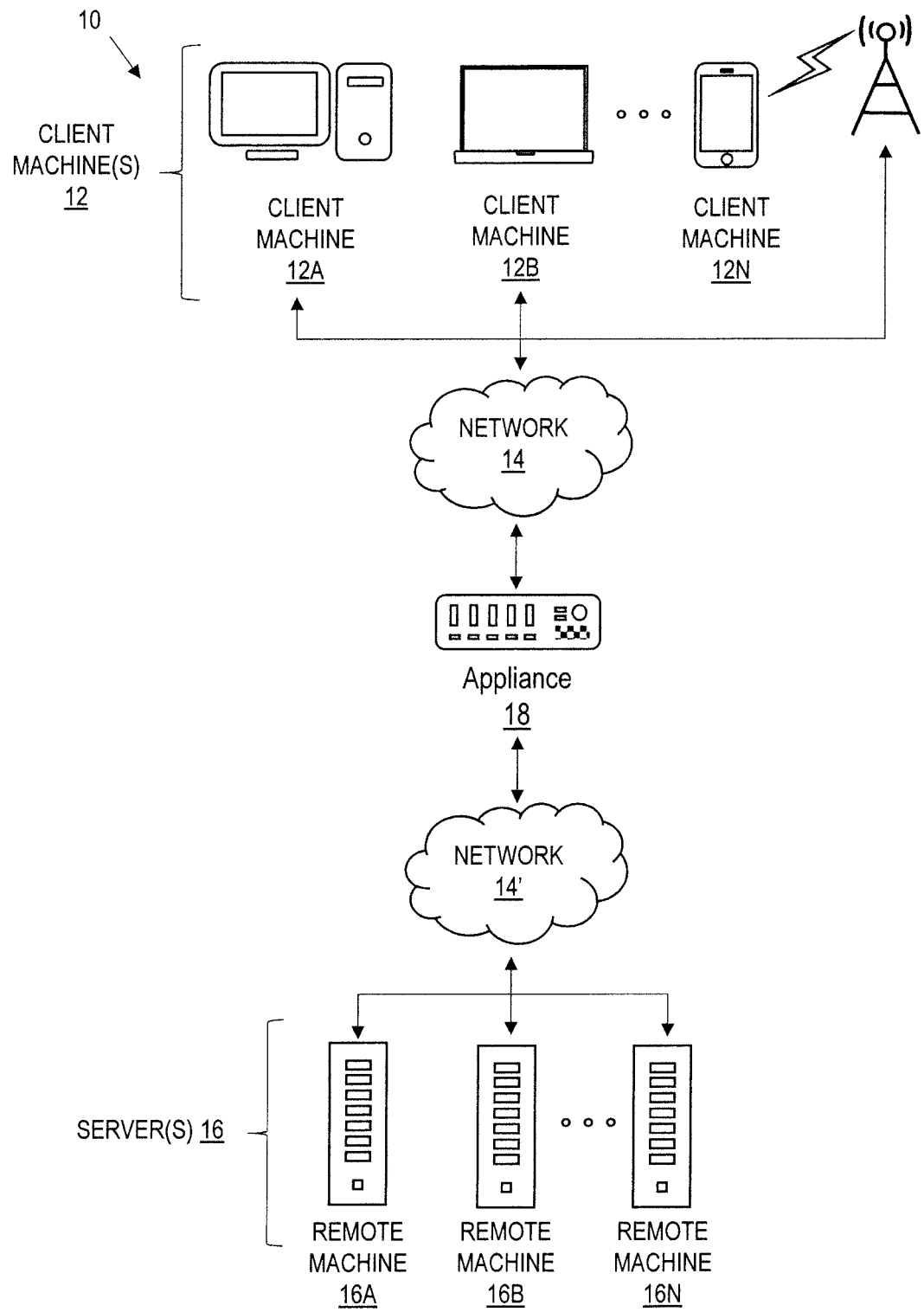
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
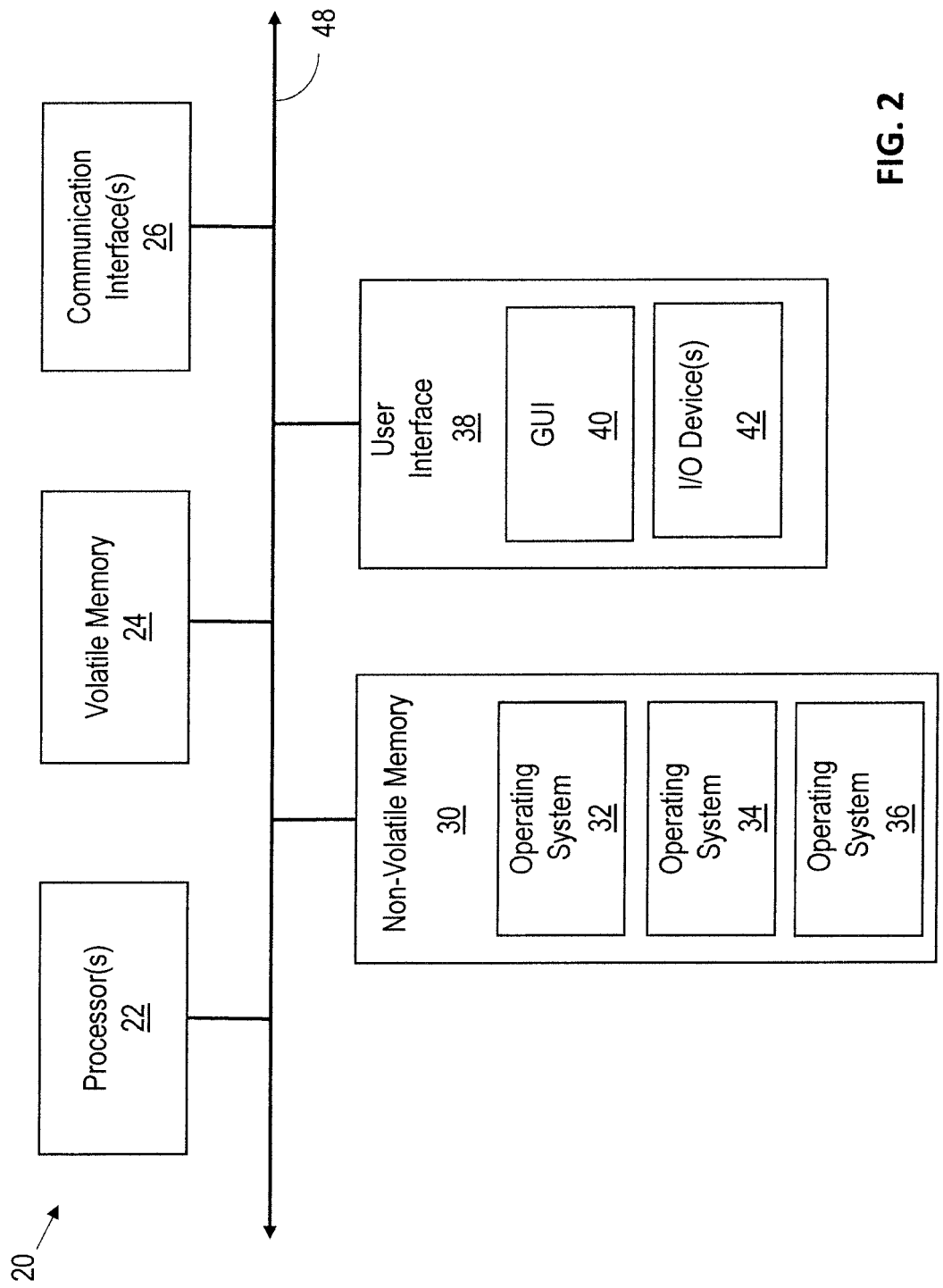
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
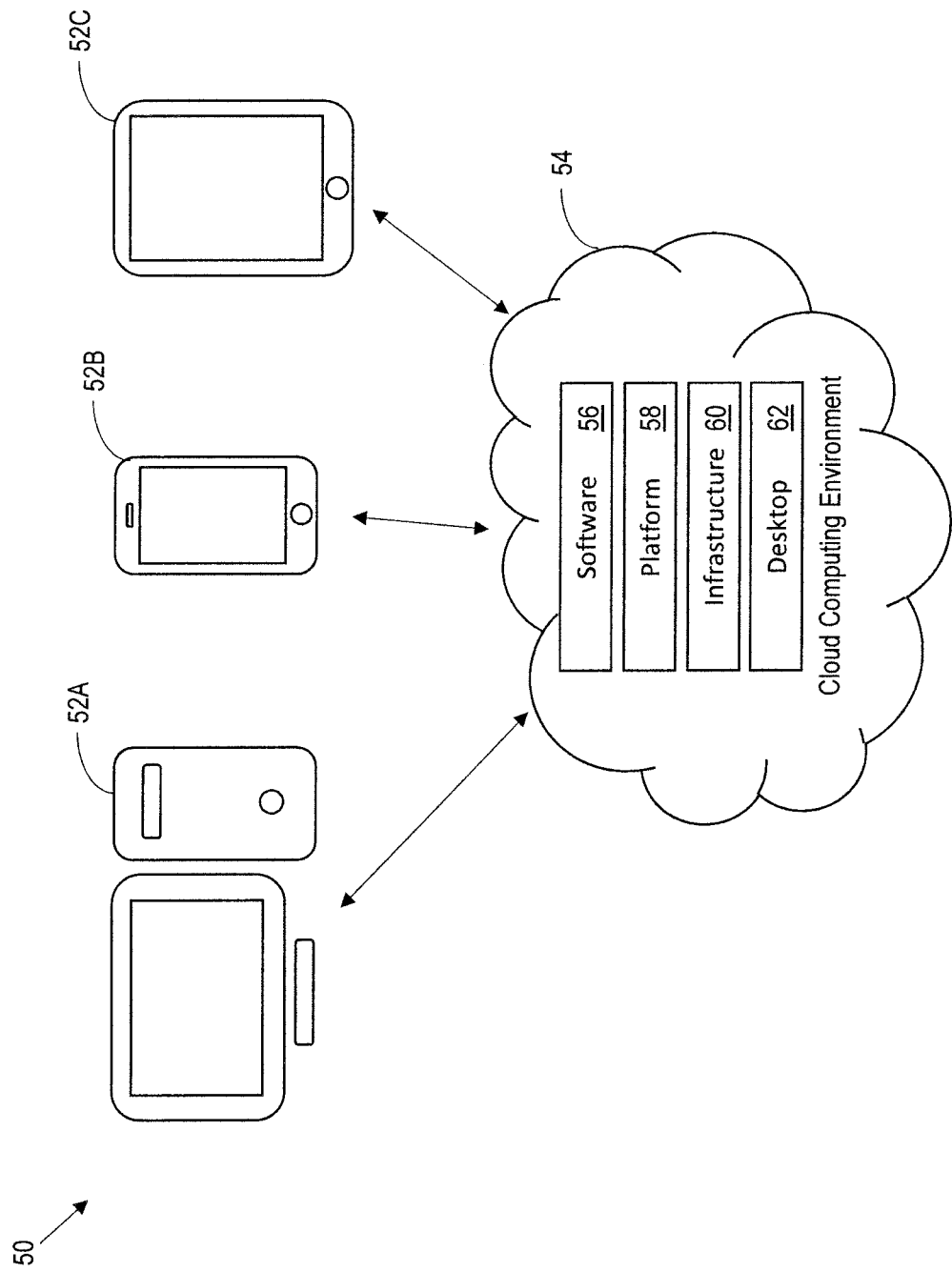
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
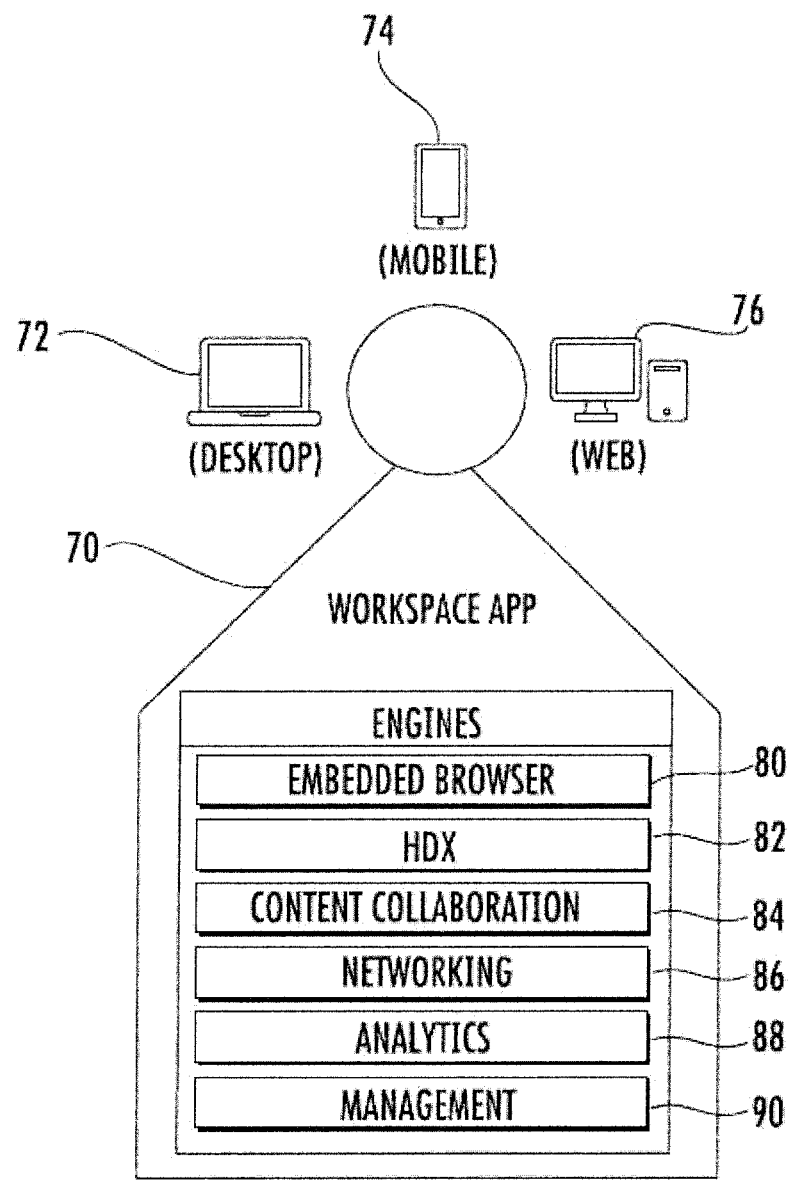
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific µ-VPN connection. A µ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
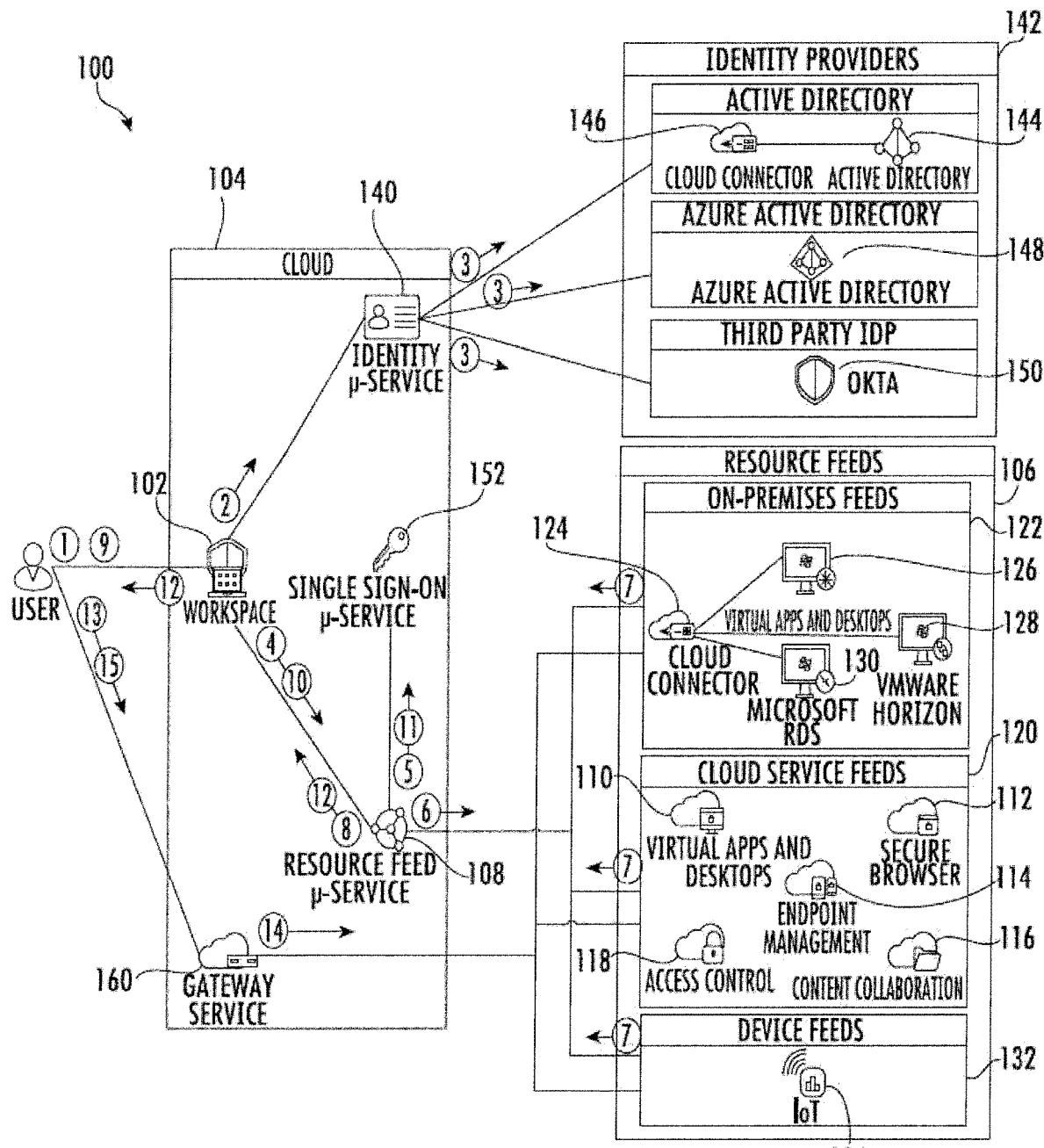
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
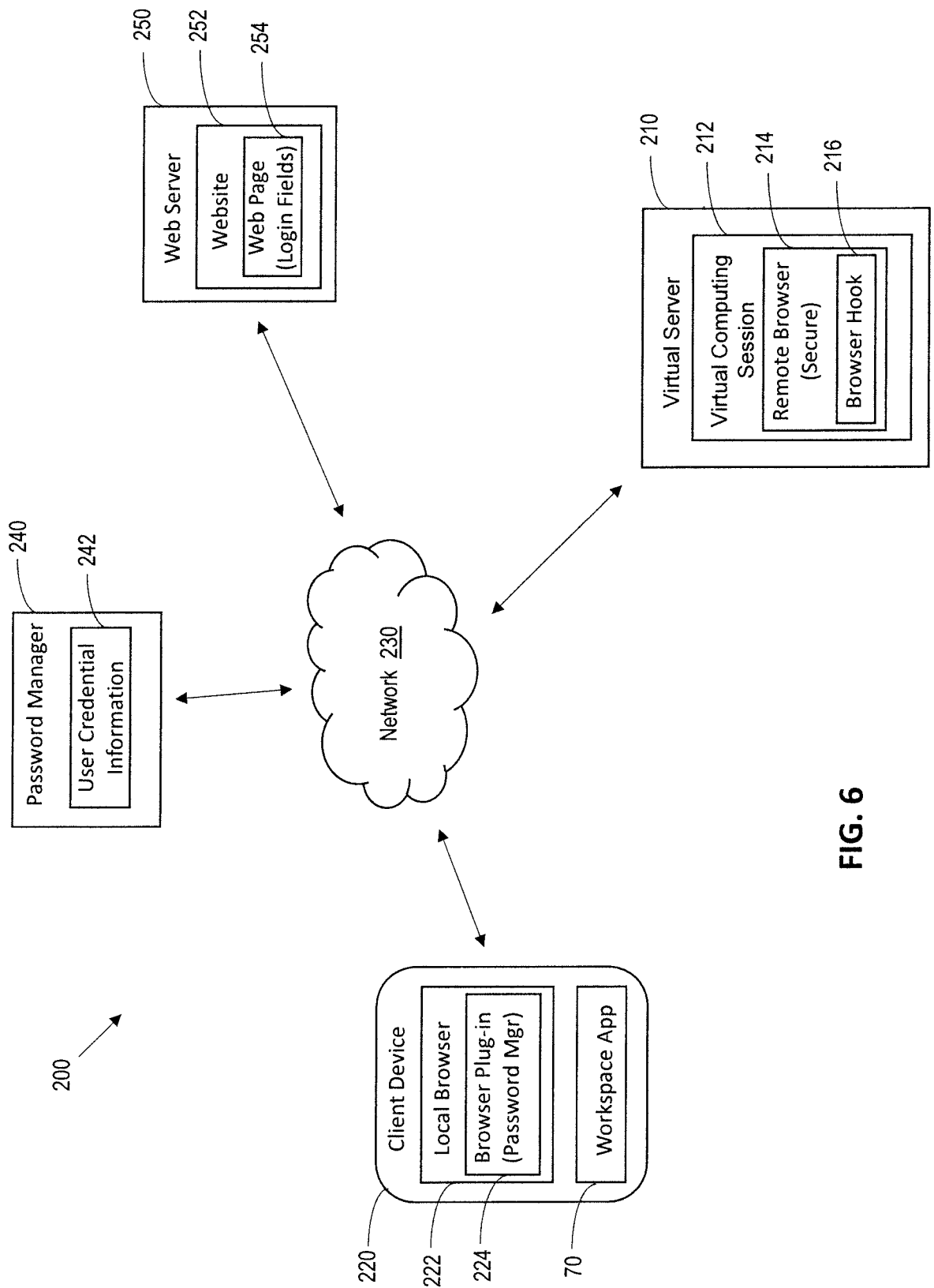
FIG. 6 is a schematic block diagram of a computing system illustrating user credential information being provided to a remote browser to access a website requiring user authentication, in which various aspects of the disclosure may be implemented.

Referring now to FIG. 6, a computing system 200 provides the ability to auto-fill user credential information 242 from a local device (or from another device outside the virtual session environment) to a remote session when a remote browser 214 navigates to a website 252 requiring user authentication. Usability of the remote browser 214 in a virtual computing session 212 is advantageously enhanced by making the user authentication process seamless to the user because user credentials no longer need to be manually entered. In addition, the devices and processes of the present disclosure provide improved security of user applications through use of a single set of user credential information for both local and remote environments.

As will be discussed in detail below, the remote browser 214 receives a user credential challenge in response to navigating to a website 252 requiring user authentication. The remote browser 214 provides the user credential challenge to the client device 220. The client device 220 uses a local browser 222 to retrieve the user credential information 242 from a password manager 240. The user credential information 242 is then provided to the remote browser 214 to be used by the website 252 for user authentication.

The illustrated computing system 200 includes a virtual server 210 configured to provide the virtual computing session 212 that includes the remote browser 214. A client device 220 is configured to access the virtual computing session 212 via a communications network 230. The client device 220 includes the local browser 222 configured to access the user credential information 242.

The remote browser 214 is configured to navigate to a website 252 requiring user authentication, receive a user credential challenge from the website 252, and provide the user credential challenge to the client device 220. The client device 220 is further configured to simulate the user credential challenge by retrieving via the local browser 222 the user credential information 242 for the remote browser 214 to be used by the website 252 for user authentication. Simulate refers to the client device 220 believing that the user credential challenge is from the local browser 222 based on the local browser 222 navigating to a website requiring user authorization. The user credential information 242 is retrieved from the password manager 240, as if needed by the local browser 222, but instead is relayed to the remote browser 214.

A password manager 240 stores user credential information 242 for various websites, and can generally be used to automatically populate or auto-fill the login fields 254 of a website 252 with the appropriate user credential information 242. An example password manager 240 is LastPass, which is available from LogMeIn, Inc. of Boston, Mass. The password manager 240 maintains a cloud based repository for storing the user credential information 242.

The password manager 240 uses a password manager plug-in 224 installed locally on the client device 220. The password manager plug-in 224 may be generally referred to as a browser plug-in 224. The browser plug-in 224 enables the password manager 240 to automatically populate the login fields 254 of a website 252 being accessed by the local browser 222 on the client device 220.

When the local browser 222 navigates to a website requiring user authentication, the browser plug-in 224 detects that user authentication is required. The browser plug-in 224 directs the local browser 222 to retrieve the user credential information 242 from the password manager 240. The login fields 254 of the website 252 are then auto-filled with the user credential information 242. Generally, the user credential information 242 includes a username and password, but other types of credentials may be used as well.

The user of the client device 220 typically accesses many different websites requiring user authentication. Consequently, the user becomes accustomed to the password manager 240 providing the user credential information 242 to the respective websites 252 without requiring user input. The user authentication process is seamless to the user.

However, current password managers 240, such as LastPass, do not support a remote browser 214 configured as a secure browser. As noted above, an example secure browser service is Citrix Secure Browser. A secure browser service has a Uniform Resource Identifier (URL) associated therewith, and is launched by the local browser 222. The URL, also termed a web address, is a reference to a web resource that specifies its location on a computer network and a mechanism for retrieving it. The remote browser 214 may be a Google Chrome browser, for example, and is running remotely and virtualized.

When configured as a secure browser, any web browsing by the remote browser 214 is completely isolated. By isolating web browsing, a website 252 accessed by the remote browser 214 does not directly transfer any browsing data to or from the client device 220. This protects an organization's network from browser-based attacks.

Since the remote browser 214 is completely isolated from the client device 220, the remote browser 214 does not provide any personalization for an end user of the client device 220. In other words, a remote browsing session within the remote browser 214 is agnostic to the user launching the session.

The remote browser 214 may also be referred to as a one-time isolated remote browser 214. This means that a remote browser session launched by the remote browser 214 is closed when the remote browser 214 is closed, or when the local browser 222 used to launch the remote browser 214 is closed. The user cannot return to the remote browsing session since the computing environment is reset. This advantageously ensures that every launch by the remote browser 212 is starting off in a well-known pristine state.

While the remote browser 214 addresses security concerns, it does so at the expense of not being supported by the password manager 240. Consequently, the user has to type in the user credential information 242 when the remote browser 214 navigates to a website 252 requiring user authentication.

Enhancing usability of the remote browser 214 by auto-filling user credential information 242 in a remote browser session will now be discussed. In accordance with one example implementation, a Citrix virtual delivery agent (VDA) may be used at the virtual server 210 to provide access to a virtual computing session 212, in cooperation with the Citrix Workspace app 70 running on the client device 220. As discussed above, the Citrix Workspace app 70 may be generally referred to as the workspace app 70. The workspace app 70 is how a user gets access to their workspace resources, to their desktop, and to their files and data.

Citrix independent computing architecture (ICA) is a protocol for the virtual server 210 that allows data to be passed between the virtual server 210 and the client device 220. Typically, multiple virtual channels are established in an Remote session between the client device 220 and the virtual server 210 to pass data therebetween. However, other suitable programs and systems may also be used in different embodiments.

When establishing a virtual computing session 212 between the client device 220 and the virtual server 210, the workspace app 70 detects if the local browser 222 within the client device 220 is using a password manager 240. More particularly, the workspace app 70 detects the browser plug-in 224 within the local browser 222. If the use of a password manager 240 is detected, the workspace app 70 will negotiate a new secure virtual channel with the virtual sever 210 to communicate user credential challenges and fulfill them. Alternatively, in some applications, an existing secure virtual channel may be used.

In a scenario where a user of the client device 220 launches a secure browser session within an ICA session, the remote browser 214 may be used to navigate to a website 252 that requires user authentication. The ICA session will also be referred to as a remote session. In this instance, the user expects the password manager 240 associated with the browser plug-in 224 to be able to auto-fill the credentials. As will now be explained in more detail, this is advantageously accomplished by adding a browser hook 216 in the remote browser 214.

The browser hook 216 allows the remote browser 214 to detect a user credential challenge by the website 252. If the local browser 222 that initiated the Remote session has a browser plug-in 224 installed and active, the Remote session remotes the user credential challenge to the client device 220. The workspace app 70 simulates the user credential challenge in such a way that the password manager 240 is triggered to auto-fill the user credential information 242. The triggering is based on the browser plug-in 224 being used to forward the user credential challenge to the password manager 240.

The workspace app 70 then remotes or otherwise provides the user credential information 242 via the secure virtual channel to the Remote session. The browser hook 216 will detect the received user credential information 242 and present this to the website 252 being accessed by the remote browser session running within the Remote session.

In addition, user credential challenges received by a remote browsing session may also be passed to the client device 220 even in double-hop scenarios. A double-hop scenario is where a remote user who is presented with a desktop is able to login to another desktop. For example, an end user may launch a virtual desktop session and launch a Secure Browser session from within the virtualized desktop. In this case, the user's password manager 240 on the end user device is prompted with the credential challenge and the user credential information 242 associated therewith is securely passed onto the secure browser session.

An example credential challenge is a user logging into their personal email. The remote browser renders the email's sign-in page. The remote browser recognizes that the HTML page contains text boxes to enter the user and password information. The remote browser then uses the ICA protocol to send a request for the user name and password along with information about the website.

On the local browser, the workspace app 70 receives the request and in turn renders certain web elements that triggers the password manager plugin running in the same browser process (or instance) to recognize that a user name and password field has been rendered. The plugin attempts to enter the information into these fields appropriately. At this point, the workspace app 70 recognizes the input and captures the information and transmits via the ICA protocol back to the remote browser process.

In the double hop scenario, many Citrix customers provide end users a virtualized desktop. Such desktops are used for day to day work by the employees. In this scenario, the employee uses a local browser to launch the virtual desktop session using the workspace app 70 on their local device. The local browser on their end device (or local device) may have a password manager plugin attached to it.

The employee now launches a remote browsing session from within the virtualized desktop. If the remote browser navigates to a website that requires credentials (for example, opening GMAIL as described above), a mechanism is provided for the remote browser to forward the credential challenge information to the browser running within the virtualized desktop, which in turn, forwards the credential challenge to the end device used by the employee. The workspace app 70 running within the local browser on the local device now simulates the credential challenge and triggers the password manager to submit credentials appropriately. The response is now forwarded to the browser running within the virtualized desktop, which in turn forwards the information to the remote browser. Since there are two hops in either direction, this is referred to as the double-hop scenario.

To further protect an organization against spoofing attacks and preventing access to malicious websites, the computing system 200 may include a proxy that controls all the traffic between the client device 220 and the internet. Since all the internet traffic passes through this proxy, the proxy performs security-related functions, such as user authentication and URL categorization. An example proxy is Citrix Secure Web Gateway (SWG). Policies configured on the proxy determine whether it intercepts, bypasses, or blocks a particular request. Access to restricted sites can be blocked by using URL filtering, for example.

Figure 7:
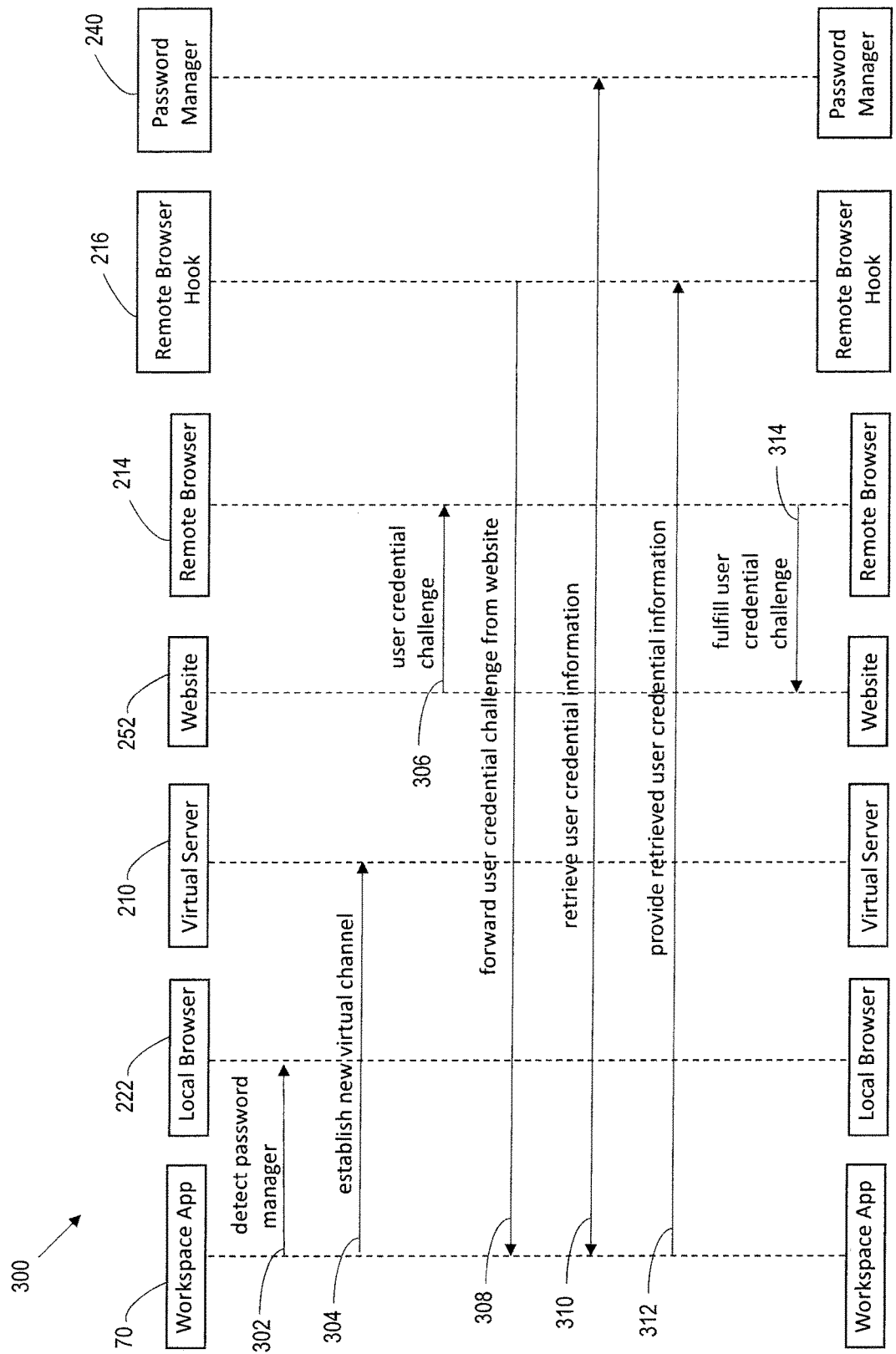
FIG. 7 is a user authentication sequence diagram for the computing system illustrated in FIG. 6.

Referring now to FIG. 7, a user authentication sequence diagram 300 for auto-filling user credential information 242 in a remote browser session will be discussed. When a virtual computing session between the client device 220 and the virtual server 210 is established, the workspace app 70 detects if the local browser 222 within the client device 220 is using a password manager 240 at line 302. This is based on a browser plug-in 224 installed within the local browser 222. If the use of a password manager 240 is detected, the workspace app 70 establishes a new secure virtual channel with the virtual sever 210 at line 304.

After the user of the client device 220 launches a secure browser session, the remote browser 214 may be used to navigate to a website 252 that requires user authentication. If user authentication is required, a user credential challenge is provided from the website 252 to the remote browser 214 at line 306.

A browser hook 216 within the remote browser 214 allows the remote browser 214 to detect the user credential challenge. The browser hook 216 allows the user credential challenge to be forwarded to the workspace app 70 at line 308.

The workspace app 70 provides the user credential challenge to the browser plugin 224, and the browser plugin 224 via the local browser provides the user credential challenge to the password manager 240 at line 310. In response, the password manager provides the corresponding user credential information 242 back to the workspace app 70 at line 310.

The workspace app 70 then remotes the user credential information 242 via the secure virtual channel to the browser hook 216 at line 312, which is then provided to the remote browser. The remote browser 214 then provides the user credential information 242 to the website 252 at line 314. The website 252 includes a web page 254 with login fields 254, and the remote browser 214 enters the user credential information into the login fields 254 without user input.

Figure 8:
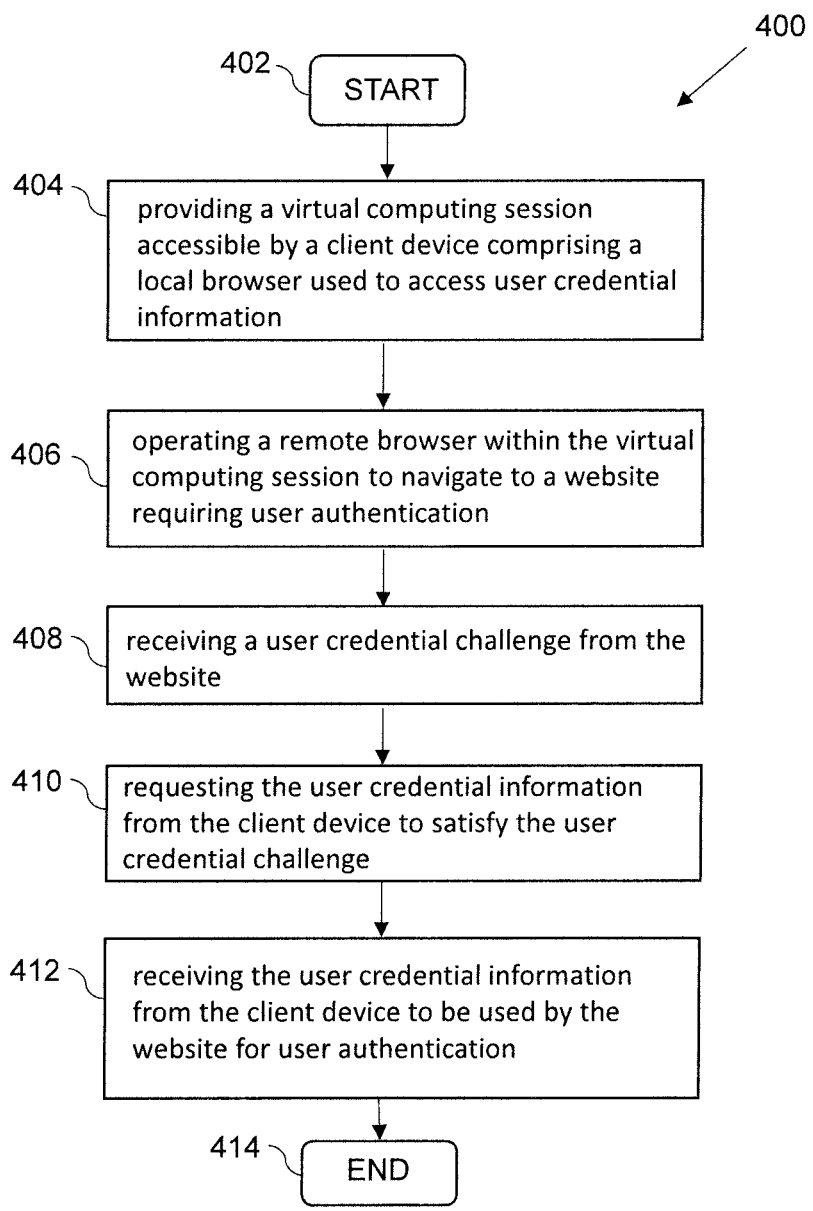
FIG. 8 is a flowchart illustrating a method for operating the virtual server illustrated in FIG. 6.

Referring now to FIG. 8, a general flowchart 400 illustrating a method for operating the virtual server 210 will be discussed. From the start (Block 402), the method includes providing a virtual computing session 212 at Block 404 that includes a remote browser 214. The virtual computing session is accessible by a client device 220 that includes a local browser 222 configured to access user credential information 242.

The remote browser 214 is operated to navigate to a website 252 requiring user authentication at Block 406. A user credential challenge is received from the website 252 at Block 408. The user credential information 242 is requested from the client device 220 to satisfy the user credential challenge at Block 410. In some cases, the user credential challenge may be characterized or translated to a request for information. Such a request may be in the form of the user credential challenge or may be in a different form, yet both request the same user credential information 242. The virtual server 210 receives the user credential information 242 from the client device 220 at Block 412 to be used by the website 252 for user authentication. The method ends at Block 414.

Still referring to the virtual server 210, the remote browser 214, in some examples, includes a browser hook 216 configured to detect receipt of the user credential challenge from the website 252, and provide the user credential challenge to the client device 220. The browser hook 216 is further configured to receive the user credential information 242 from the client device 220, and provide the user credential information 242 to the remote browser 214 for user authentication.

The virtual server 210, in some examples, is further configured to establish a virtual channel with the client device 220. The virtual channel is for exchanging the user credential challenge and the user credential information 242.

The remote browser 214 is configured to receive browsing data from the website 252, and to isolate the received browsing data from the client device 220. The remote browser 214 is configured to launch a remote browsing session, and a user of the client device 220 cannot return to the remote browsing session after the remote browser session is closed.

Figure 9:
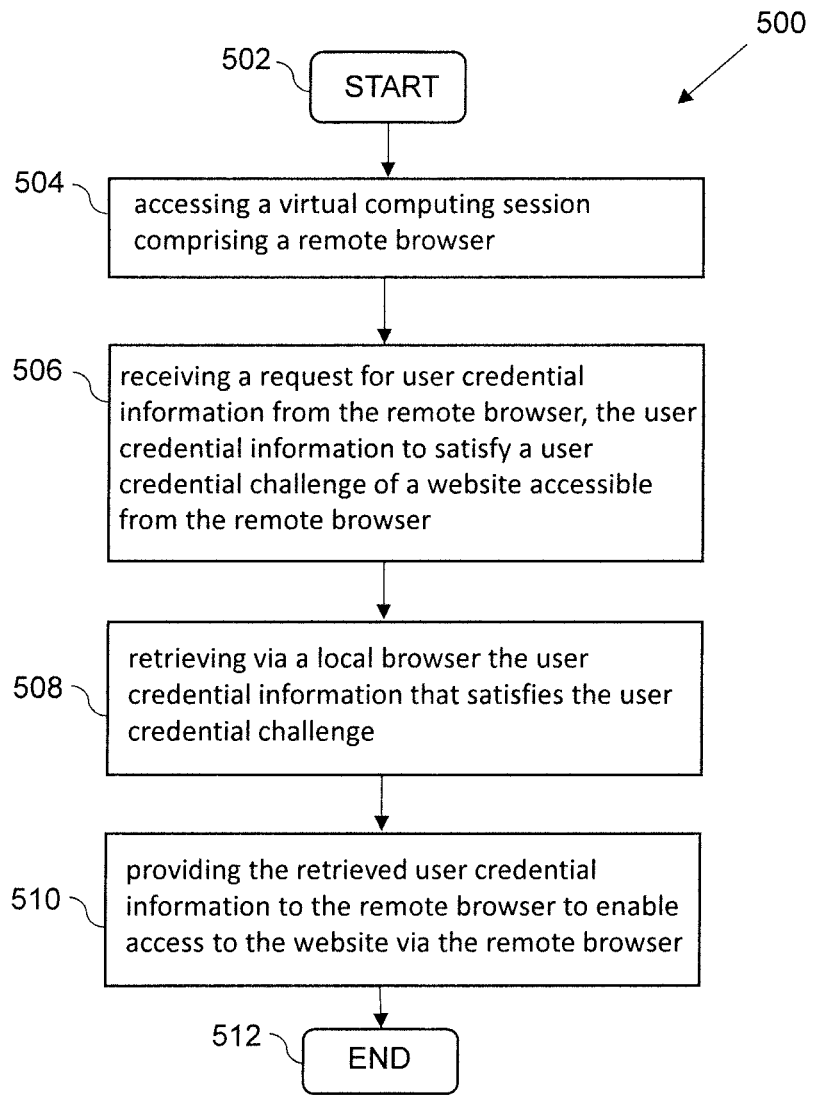
FIG. 9 is a flowchart illustrating a method for operating the client device illustrated in FIG. 6.

Referring now to FIG. 9, a general flowchart 500 illustrating a method for operating the client device 220 will be discussed. From the start (Block 502), the method includes accessing a virtual computing session 212 at Block 504. The virtual computing session 212 includes a remote browser 214. A request for user credential information 242 is received from the remote browser 214 at Block 506. The user credential information 242 is to satisfy a user credential challenge of a website accessible from the remote browser 214. The client device 220 retrieves via a local browser 222 the user credential information 242 that satisfies the user credential challenge at Block 508. The retrieved user credential information 242 is provided to the remote browser 214 to enable access to the website 252 via the remote browser 214 at Block 510. The method ends at Block 512.

Still referring to the client device 220, the user credential information 242 is stored within a password manager 240. The local browser 222, in some examples, includes a password manager plugin 224 configured to receive the user credential challenge from the remote browser 214, forward the user credential challenge via the local browser 222 to the password manager 240 to retrieve the user credential information 242, and provide the retrieved user credential information 242 to the remote browser 214.

The client device 220, in some examples, establishes a virtual channel for the virtual computing session 212 in response to the password manager plugin 224 being included within the local browser 222. The virtual channel is for exchanging the user credential challenge and the user credential information 242. The remote browser 214 is configured to receive browsing data from the website 252, and to isolate the received browsing data from the client device 220.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computing system comprising:
   a virtual server comprising a processor and a memory coupled to said processor, and said processor configured to provide a virtual computing session comprising a remote browser;
   a client device comprising a processor and a memory coupled to said processor, and said processor configured to access the virtual computing session via a communications network, and comprising a local browser configured to access user credential information;
   said remote browser is configured to:
      navigate to a website requiring user authentication,
      receive a user credential challenge from the website,
      provide the user credential challenge to said client device, and
      request the user credential information from said client device to satisfy the user credential challenge; and
   said client device is further configured to:
      forward the user credential challenge via the local browser to a password manager to retrieve the user credential information, and
      provide the retrieved user credential information to the remote browser for user authentication to satisfy the user credential challenge of the website.

2. The computing system according to claim 1 wherein the remote browser includes a browser hook configured to detect receipt of the user credential challenge from the website.

3. The computing system according to claim 2 wherein the browser hook is further configured to perform the following:
   receive the user credential information from said client device; and
   provide the user credential information to the remote browser for user authentication.

4. The computing system according to claim 1 further comprising the password manager configured to store the user credential information.

5. The computing system according to claim 1 wherein the remote browser is configured to receive browsing data from the website, and to isolate the received browsing data from said client device.

6. A server comprising:
a processor and a memory coupled to said processor and configured to perform the following:
provide a virtual computing session comprising a remote browser, with the virtual computing session accessible by a client device comprising a local browser configured to access user credential information; and
operate the remote browser to perform the following:
navigate to a website requiring user authentication,
receive a user credential challenge from the website,
provide the user credential challenge to the client device,
request the user credential information from the client device to satisfy the user credential challenge, and
receive the user credential information from the client device to be used by the website for user authentication to satisfy the user credential challenge of the website, with the received user credential information being retrieved via the local browser from a password manager that received the user credential challenge.

7. The server according to claim 6 wherein the remote browser includes a browser hook configured to perform the following:
detect receipt of the user credential challenge from the website; and
provide the user credential challenge to the client device.

8. The server according to claim 7 wherein the browser hook is further configured to perform the following:
receive the user credential information from the client device; and
provide the user credential information to the remote browser for user authentication.

9. The server according to claim 6 wherein the remote browser is configured to receive browsing data from the website, and to isolate the received browsing data from the client device.

10. A method comprising:
providing a virtual computing session comprising a remote browser, with the virtual computing session accessible by a client device comprising a local browser configured to access user credential information; and
operating the remote browser to perform the following:
navigate to a website requiring user authentication,
receive a user credential challenge from the website,
provide the user credential challenge to the client device,
request the user credential information from the client device to satisfy the user credential challenge, and
receive the user credential information from the client device to be used by the website for user authentication to satisfy the user credential challenge of the website, with the received user credential information being retrieved via the local browser from a password manager that received the user credential challenge.

11. The method according to claim 10 wherein the remote browser includes a browser hook configured to perform the following:
detecting receipt of the user credential challenge from the website; and
providing the user credential challenge to the client device.

12. The method according to claim 11 wherein the browser hook is further configured to perform the following:
receiving the user credential information from the client device; and
providing the user credential information to the remote browser for user authentication.

13. The method according to claim 10 wherein the remote browser is configured to receive browsing data from the website, and to isolate the received browsing data from the client device.

* * * * *